United States Patent Office 3,400,129
Patented Sept. 3, 1968

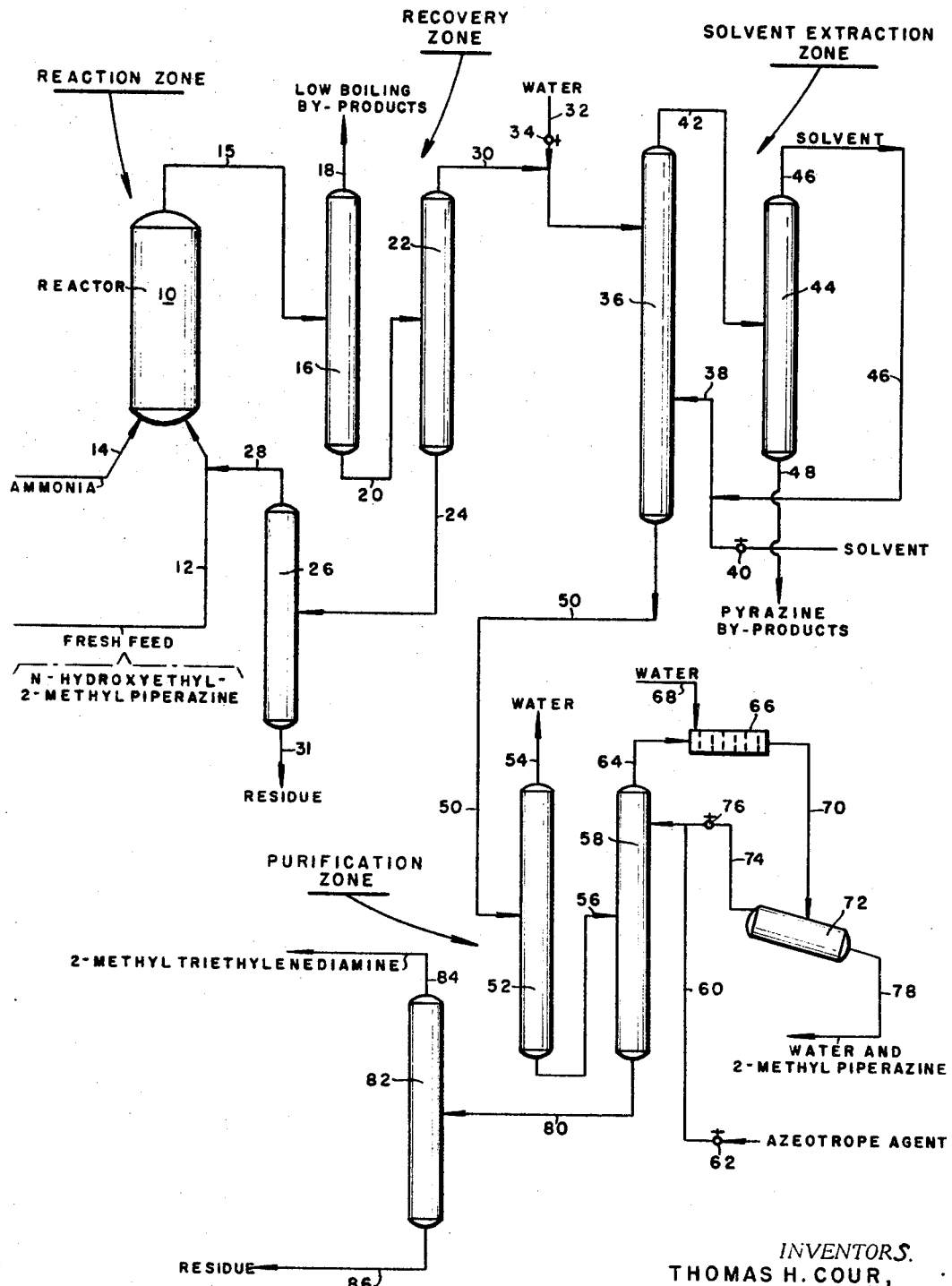

3,400,129
PURIFICATION OF 2 - METHYLTRIETHYLENEDI-
AMINE BY SOLVENT EXTRACTION AND AZEO-
TROPIC DISTILLATION
Thomas H. Cour and Walter H. Brader, Jr., Austin, Tex.,
assignors to Jefferson Chemical Company, Inc., Houston, Tex., a corporation of Delaware
Filed Oct. 15, 1965, Ser. No. 496,529
6 Claims. (Cl. 260—268)

ABSTRACT OF THE DISCLOSURE

Crude 2-methyltriethylenediamine can be purified in a process which incorporates a two-solvent extraction step with one of the solvents being water and the other an organic solvent for pyrazines, an azeotropic distillation step where 2-methylpiperazine is azeotropically distilled and a step where the purified 2-methyltriethylenediamine is recovered.

This invention relates to a method for the purification of bicyclic amines. More particularly, this invention relates to a method for recovering purified 2-methyltriethylenediamine from a crude reaction product comprising the same.

In Brader U.S. Patent No. 3,157,657, there is disclosed a method for the preparation of the catalytic synthesis of 2-methyltriethylenediamine from N-hydroxyethyl-3-methylpiperazine, N-hydroxyethyl-2-methylpiperazine, N, N'-dihydroxyethyl-2-methylpiperazine, or a mixture of two or more such compounds (sometimes hereafter referred to as methyl-substituted hydroxyethylpiperazines). Another method for the synthesis of 2-methyltriethylenediamine is disclosed in copending Brader et al. application Ser. No. 371,098, filed May 28, 1964, now U.S. Patent 3,297,701, and entitled "Synthesis of Diazabicyclo-(2,2,2)-Octane and Derivatives." A third synthesis is disclosed in copending Brader application Ser. No. 396,792 filed Aug. 31, 1964, now U.S. Patent 3,342,820, and entitled "Synthesis of C-Alkyl Triethylenediamine." Also, in Belgium Patent No. 631,622, there is disclosed a method for the synthesis of 2-methyltriethylenediamine.

As is pointed out in the foregoing references, particularly in copending application Ser. No. 396,792, supra, by-products are formed when methyl-substituted hydroxyethylpiperazines are cyclized to form 2-methyltriethylenediamine in the presence of a suitable solid cyclization catalyst, such as a silica-alumina catalyst, alumina or metal phosphate catalyst, which by-products include triethylenediamine, pyrazine and alkyl-substituted pyrazines, and also 2-methylpiperazine.

The separation of the pyrazines and 2-methylpiperazine from 2-methyltriethylenediamine presents a difficult problem, because the physical properties of the impurities are very similar to those of 2-methyltriethylenediamine, whereby they are removed from 2-methyltriethylenediamine only with great difficulty.

It has been discovered in accordance with the present invention, however, that high-purity 2-methyltriethylenediamine can be prepared in an efficient manner through the removal of pyrazine-type by-products by solvent extraction and sequential removal of 2-methylpiperazine by azeotropic distillation in a manner to be described.

The invention will be further illustrated with reference to the accompanying drawing, which is a schematic flow sheet illustrating the present embodiment of the present invention. In the flow sheet, the reactor and solvent and solvent extraction zones have been shown schematically, and the conventional equipment associated therewith, such as reflux condensers, reboilers, pumps, valves, etc., have not been shown in the interest of simplicity.

Turning now to the drawing, there is shown a sequence for the manufacture and purification of 2-methyltriethylenediamine wherein the 2-methyltriethylenediamine is formed from a fresh feed stock in a reaction zone, recovered in crude form in a recovery zone, subjected to extraction in a solvent extraction zone for the removal of pyrazine by-products and subjected to final purification for the removal of 2-methyltriethylenediamine in a purification zone.

In particular, a fresh feed stock for the process is charged to a reactor 10 by way of a feed line 12. Ammonia may also be added as a coreactant by way of a charge line 14.

The fresh feed stock may suitably be a mixture of methyl-substituted hydroxyethylpiperazines prepared, for example, by the ethoxylation of 2-methylpiperazine with excess ethylene oxide.

The reactor 10 should contain an appropriate catalyst, such as a silica-alumina cracking catalyst, kaolin, alumina or a metal phosphate catalyst, such as aluminum phosphate, ferric phosphate, ferric potassium phosphate, etc.

The reaction conducted in reactor 10 is suitably a vapor-phase reaction conducted under reaction conditions including a temperature within the range of about 350° to about 450° C., an ammonia charge rate of about 1 to 15 mols of ammonia per mol of amine feed stock and a space velocity within the range of about 0.2 to about 2 pounds of feed per hour per pound of catalyst.

Within the reactor 10, the feed stock is converted to a variety of reaction products comprising, for example, 2-methyltriethylenediamine, a minor amount of triethylenediamine, water, 2-methylpiperazine and pyrazines, such as pyrazine, 2-methylpyrazine and higher alkylpyrazines. Normally, the reaction products will comprise from about 20 to about 60 wt. percent of 2-methyltriethylenediamine, from about 1 to about 10 wt. percent of triethylenediamine, from about 1 to about 10 weight percent of 2-methylpiperazine and from about 1 to about 10 wt. percent of pyrazines.

The reaction products are discharged from the reactor 10 by way of a line 15 leading to a first distillation zone 16 wherein low-boiling by-products, such as ammonia, water, etc., are removed by a line 18 so as to provide a bottoms fraction 20 having a nominal cut point of about 130° C.

The bottoms 20 is charged to a second column 22 wherein the distillate fraction is obtained boiling within the range of 130° to about 190° C. comprising at least about 70 wt. percent of 2-methyltriethylenediamine, the remainder being composed of pyrazines, 2-methylpiperazine and triethylenediamine.

The bottoms fraction 24 from the distillation column 22 comprises residue components and unreacted feed stock. This fraction may suitably be charged to a distillation column 26 for the recovery of distillation fraction 28 comprising unreacted feed stock and a residue fraction 31. The unreacted feed stock may be recycled to the reactor 10 by way of the charge line 12, as shown.

The distillate fraction 30 from the column 22 contains the impurities mentioned above, which can be removed from 2-methyltriethylenediamine by further distillation only with great difficulty.

It has been discovered, however, that solvent extraction involving a pair of solvents can be used to remove the substituted pyrazines from the resulting fraction. One of the components of the solvent pair should be water. The other component may be any of the organic solvents which are not reactive with amines. Thus, olefins boiling to about 160° C., such as hexene, octene and nonene, aromatic hydrocarbons, such as benzene, toluene, the xylenes, ethyl benzene and the propyl benzenes, aliphatic hydrocarbons boiling to about 160° C., such as n-hexane, n-heptane, isooctane, to about n-nonane and methylnonane, etc., halogenated aromatic hydrocarbons, such as chlorobenzene, and chloromethylated toluenes, such as chlorotoluenes, ethers, such as diethylether, furan and water insoluble nitriles, such as alkylbenzonitriles may be employed. Because of its selectivity, benzene is preferred.

It is also pertinent to observe that the solvent should not boil within the range from about 160° to about 210° C.

Water is employed in the range from about 50 to about 150 wt. percent, based on the weight of the fraction 30, and solvent is employed within the range of about 50 to about 150 wt. percent, also based on the weight of the fraction 30.

In conducting this operation, water may be added to the fraction 30 by way of a charge line 32 controlled by a valve 34, in an appropriate amount, and the resultant mixture may be charged adjacent to the top of extraction zone 36.

The solvent, such as benzene, in an amount sufficient to provide quantities first for the extraction, is added adjacently to the bottom of the column 36 by way of a charge line 36 by way of a charge line 38 controlled by valve 40.

The extract comprising solvent and pyrazines is removed overhead from the column 36 by way of a line 42 and may suitably be charged to distillation column 44 wherein a clean solvent fraction is removed overhead by a line 46 and recycled to the charge line 38 for the extraction zone 36 wherein the bottoms fraction 48 comprising pyrazines is removed from the system.

The raffinate from the zone 36 is discharged by way of a line 50 leading to a purification zone comprising an initial topping column 52 wherein water is removed overhead by way of a line 54. The bottoms 56 from the column 52 are charged to an azeotropic distillation column 58 for removal of the 2-methylpiperazine.

This is accomplished in accordance with the present invention by employing an organic azeotroping agent, such as an aromatic or aliphatic hydrocarbon, an olefin, a chlorinated aromatic hydrocarbon, etc., boiling below 175° C., and more preferably below 150° C. The azeotroping agent should be water insoluble. Examples of appropriate azeotroping agents that may be used include olefinic hydrocarbons, such as nonene (a propylene trimer fraction), or mixtures of olefins boiling in the range of 100° C. to about 160° C., an aromatic hydrocarbon, such as toluene, the xylenes, or other alkyl benzenes boiling in the range 100°–160° C., an aliphatic hydrocarbon, such as light straight run gasoline boiling in the range 100°–150° C., and containing hexane, octane, nonane, decane and isomers thereof or a halogenated aromatic hydrocarbon, such as chlorobenzene or other alkyl chloroaromatics boiling in the range 100°–160° C.

The azeotroping agent employed is suitably charged to the column 58 by a charge line 60 controlled by a valve 62 in an amount such that it constitutes at least about 85 wt. percent of the overhead fraction 64 whereby an overhead fraction will be obtained comprising the azeotroping agent and 2-methylpiperazine with only minimal product carry-over.

The overhead fraction removed by way of a line 64 may suitably be mixed in a zone 66 with water added by way of a line 68, and the mixture may be discharged by a line 70 leading to separation zone 72 wherein phase separation occurs. Supernatant azeotroping agent may be discharged by a line 74 controlled by a valve 76 leading to an azeotroping charge line 60 for the column 58.

The azeotroping phase comprising water and 2-methylpiperazine may be discharged to a zone 72 by way of a line 78.

The bottoms fraction 80 from the column 58 may be charged to a final purification column 82 wherein a distillate fraction consisting essentially of 2-methyltriethylenediamine may be taken overhead by way of a line 84; the residue fraction being discharged by way of a line 86.

OPERATION

By way of specific example, a feed stock comprising essentially of a mixture of N-hydroxyethyl-2-methylpiperazine with N,N'-dihydroxyethyl-2-methylpiperazine and from about 5 to about 10 mols of ammonia per mol of feed may be charged to a reactor 10 containing an aluminum phosphate catalyst by way of charge lines 12 and 14, respectively.

The reactor effluent 15, after being discharged in the column 16, may be cut in the column 22 into a crude product fraction 30 containing about 1 to 10 wt. percent of 2-methylpiperazine and about 50 to 80 wt. percent of 2-methyltriethylenediamine.

This fraction, after being mixed with an equal weight of water charged by way of a line 32, may be charged to the column 36 where it is countercurrently contacted with benzene charged by way of a line 38 at a rate about equal to the charge rate of the aqueous feed from the line 30.

The raffinate 50 from the step, after being dewatered in the column 52, may be charged to azeotropic zone 58 wherein it may be azeotropically distilled with an equal weight of nonene charged by way of a line 76 at a reflux ratio of about 10:3.

The fraction 80 from the azeotrope distillation may then be finally distilled in the column 82 to provide a 2-methyltriethylenediamine product fraction containing at least 98 wt. percent of 2-methyltriethylenediamine, the principal remaining component being triethylenediamine and only trace amounts of pyrazines and 2-methylpiperazine being present.

The invention will be further illustrated with reference to the following specific examples, which are given by way of illustration and not as limitations on the scope of this invention.

Example I

To determine the feasibility of the solvent extraction of pyrazines from a methyltriethylenediamine solution using a solvent pair, a series of single stage extractions were carried out with a variety of solvents. The extraction procedure involved mixing in a separatory funnel a solution containing 50% water, 25% methyltriethylenediamine and 25% 2-methylpyrazine with an equal volume of a water insoluble organic solvent. The mixture was shaken well, allowed to settle, the phases separated and weighed. The individual phases were then analyzed quantitatively by gas-liquid chromatography. The results of these experiments are shown in Table 1:

TABLE 1

| Solvent | Extraction coefficient, $\beta$ | Recovery yield, wt. percent | Extract yield, wt. percent |
|---|---|---|---|
| n-Hexene | 29 | 99.5 | 20 |
| Cyclohexane | 19 | 95.7 | 62 |
| Benzene | 62 | 99.0 | 20 |
| n-Hexane | 29 | 99.5 | 15 |
| Ethyl ether | 32 | 80 | 42.5 |

Each solvent was then treated to the following analysis:

$$\text{Extraction coefficient, } \beta = \frac{\left(\frac{X \text{ pyr.}}{X \text{ MTD}}\right) \text{Ext.}}{\left(\frac{X \text{ MTD}}{X \text{ pyr.}}\right) \text{RAFF.}}$$

$$\text{Recovery yield, percent} = \frac{\text{Wt. MTD in RAFF.}}{\text{Wt. MTD charged}} \, 100$$

$$\text{Extract yield, percent} = \frac{\text{Wt. pyr. in ext.}}{\text{Wt. pyr. charged}} \, 100$$

In the equation:

Pyr.—2-methylpyrazine
MTD—methyltriethylenediamine
X—mol fraction
RAFF.—raffinate
Ext.—extract The results show that each of the solvents investigated has a good selectivity for the extraction of pyrazines from an aqueous methyltriethylene diamine solution. Benzene was the solvent preferred because it had a high selectivity, $\beta$, a high recovery and extract yield and a low boiling point for ease of solvent recovery.

Example II

A feed stream of 79.3% wt. percent methyltriethylenediamine and about 1.4% of pyrazines was charged to an extraction column having a length to diameter ratio of about 36 in admixture with an equal weight of water.

Benzene was charged to the bottom of the column at an equivalent rate of about 100 pounds per hour. In related experiments, the identical conditions were employed except that other extractants were employed. The results are set forth in Table 2:

67.9% of methyltriethylenediamine and 500 grams of nonene. The charge was batch distilled through a column 1 inch by 12 inches packed with T316 stainless steel Goodloe packing. Distillate was removed at 10:3 reflux ration until a head temperature of 152° C. was reached. At this point an additional 500 grams of nonene was added to the stillpot. Once again distillate was removed at 10:3 reflux ratio until a head temperature of 155° C. was reached. The still was cooled, and samples of each distillate fraction and the residue were analyzed by gas-liquid chromatograhy. 2-methylpiperazine removal was 97.8% effective, while an 83% recovery of methyltriethylenediamine was obtained in the bottom. The data is summarized in Table 4. The distillate product called fraction No. 1 was treated with 100 grams of water, shaken and allowed to settle in a separatory funnel. Table 4 shows that this method is 100% effective in removing amines from the solvent.

Example IV

To a one-liter boiling flask were charged 500 grams of petroleum naphtha having a boiling range of 120° to 140° C. and 500 grams of a mixture containing 20.5% of 2-methylpiperazine and 67.0% of methyltriethylenedi-

TABLE 2.—EXTRACTION OF IMPURITIES FROM METHYLTRIETHYLENEDIAMINE RICH FRACTIONS

| Run No | 2853 11-6 | 2853 16-12 | 2853 11-16 | 2853 16-17 | 2869 4-16 |
|---|---|---|---|---|---|
| Rates, lbs./hr.: | | | | | |
| Amine-water soln. feed | 115 | 84 | 115 | 84 | |
| Benzene feed | 120 | 96 | 158 | 96 | |
| Extract (benzene phase) | 115 | 96 | 151 | 90 | 89 |
| Raffinate (water phase) | 103 | 116 | 111 | 89 | 65 |
| Analysis, wt. percent (GLC): | | | | | |
| Amine-water soln.: | | | | | |
| Water | 50 | 50 | 50 | 50 | 50 |
| 2-methylpiperazine | 5.0 | 5.0 | 5.0 | 5.0 | 2.0 |
| Pyrazines | 0.7 | 0.7 | 0.7 | 0.7 | 0.5 |
| 2-methyltriethylenediamine | 42.7 | 42.7 | 42.7 | 42.7 | 44.4 |
| Raffinate: | | | | | |
| Water | Bal. | Bal. | Bal. | Bal. | Bal. |
| 2-methylpiperazine | 4.6 | 4.8 | 4.9 | 4.4 | 2.0 |
| Pyrazines | 0.2 | 0.4 | 0.2 | 0.3 | 0.5 |
| 2-methyltriethylenediamine | 37.5 | 44.0 | 40.0 | 41.5 | 44.4 |
| Extract: | | | | | |
| Benzene | Bal. | Bal. | Bal. | Bal. | Bal. |
| 2-methylpiperazine | 0.3 | 0.3 | 0.3 | 0.3 | |
| Pyrazines | 0.6 | 0.6 | 0.5 | 0.6 | 0.5 |
| 2-methyltriethylenediamine | 4.1 | 3.9 | 3.8 | 4.2 | 5.1 |
| Extraction coefficient, $\beta$ | .00078 | .0014 | .00066 | .00103 | .00110 |
| Recovery yield, percent | 89.3 | 93.3 | 89.5 | 90.5 | 86.3 |
| Extract yield, percent | 77.3 | 55.8 | 77.5 | 66.5 | |

The azeotropic distillation of a 2-methyltriethylenediamine contacted with 2-methylpiperazine is illustrated n the folowing examples.

Example III

To a one-liter boiling flask were charged 500 grams of a mixture containing 20.5% of 2-methylpiperazine and amine. The mixture was distilled at a reflux ratio of 10:3 and to a head temperature of 170° C., whereupon an additional 500 grams of solvent was added to the stillpot and the distillation resumed once again to a head temperature of 175° C. Each fraction was analyzed and the results were as follows: 99+% 2-methylpiperazine removed; 75.5% methyltriethylenediamine recovery.

TABLE 3

| Fraction | Weight, grams | Temp., °C. Pot | Temp., °C. Head | Reflux ratio | Analysis, GLC wt. percent Lights | 2-MP [1] | Pyrazines | TEDA [2] | MTD [3] |
|---|---|---|---|---|---|---|---|---|---|
| Charge: | | | | | | | | | |
| MTD [3] fraction | 500 | | | | | 20.5 | 1.0 | 13.0 | 67.0 |
| Nonene | 500 | | | | | | | | |
| Fraction 1 | 566 | 144-182 | 94-152 | 10/3 | Bal. | 9.4 | | 0.3 | 0.1 |
| Additional nonene charged | 500 | | | | | | | | |
| Fraction 2 | 562 | 147-182 | 131-155 | 10/3 | Bal. | 2.0 | 0.1 | 4.9 | 4.5 |
| Residue | 341 | | | | | 0.6 | 1.4 | 13.3 | 81.6 |
| Recovery | 1,469 | | | | | | | | |
| Loss | 31 | | | | | | | | |

2-methylpiperazine removal:
$$\left[\frac{(500 \times 0.205) - (341 \times 0.006)}{(500 \times 0.205)}\right] 100 = 97.8\%$$

2-methyltriethylenediamine recovery:
$$\left[\frac{341 \times 0.816}{500 \times 0.67}\right] 100 = 83\%$$

[1] 2-methylpiperazine.   [2] Triethylenediamine.   [3] 2-methyltriethylenediamine.

TABLE 4

| Fraction | Weight, grams | Temp., °C. Pot | Temp., °C. Head | Reflux ratio | Analysis, GLC wt. percent Lights | 2-MP [1] | Pyrazines | TEDA [2] | MTD [3] |
|---|---|---|---|---|---|---|---|---|---|
| Charge: MTD [3] fraction | 500 | (ASTM; IBP, 120° C. EP, 140° C.) | | | 20.5 | 1.0 | | 13.0 | 67.0 |
| Skellysolve "V" [4] | 500 | | | | | | | | |
| Fraction 1 | 597 | 141–184 | 92–170 | 10/3 Bal. | 5.5 | | | 1.5 | 0.7 |
| Additional; Skellysolve "V" [4] Charged | 500 | | | | | | | | |
| Fraction 2 | 554 | 141–184 | 109–175 | 10/3 Bal. | Trace | Trace | | 3.3 | 2.5 |
| Residue | 346 | | | | | Trace | | 12.0 | 73.0 |
| Recovery | 1,497 | | | | | | | | |
| Loss | 3 | | | | | | | | |

2-methylpiperazine removal:

$$100\left[\frac{500 \times 0.205 - 346 \times \text{Trace}}{500 \times 0.705}\right] = 99+\%$$

2-methyltriethylenediamine recovery:

$$\left[\frac{346 \times .75}{500 \times .67}\right] 100 = 75.5\%$$

[1] 2-methylpiperazine.
[2] Triethylenediamine.
[3] 2-methyltriethylenediamine.
[4] Skellysolve "V" is a mixture of aliphatic hydrocarbons fractionated from light "straight run" gasoline.

TABLE 5.—EXTRACTION OF AMINE FROM NONENE AZEOTROPE OF TABLE 3

| Charge: | | |
|---|---|---|
| Table 3, Fraction No. 1 | 533 grams | 9.4% 2-methylpiperazine. |
| Water | 100 grams | |
| Raffinate (organic layer) | 461 grams | No amine detected. |
| Extract (water layer) | 229 grams | 27% 2-methylpiperazine (by titration). |

Having thus described our invention, what is claimed is:

1. In a method for recovering high-purity 2-methyltriethylenediamine from a crude reaction mixture comprising 2-methyltriethylenediamine, pyrazines and 2-ethylpiperazine, the improvement which comprises the steps of:
    (A) contacting said crude reaction mixture in a solvent extraction zone with a solvent pair, including water and a water insoluble organic solvent for the pyrazines boiling outside the range of 160° to 210° C. to obtain a substantially pyrazines-free raffinate,
    (B) azeotropically distilling said raffinate in the presence or an organic azeotroping agent for 2-methylpiperazine boiling below about 175° C. to thereby obtain a bottoms fraction substantially free from pyrazines and 2-methylpiperazine, and
    (C) distilling the bottoms fraction of the azeotropic distillation to recover the high-purity 2-methyltriethylenediamine.

2. In a method for recovering high-purity 2-methyltriethylenediamine from a crude reaction mixture comprising 2-methyltriethylenediamine, pyrazines and 2-methylpiperazine, the improvement which comprises the steps of:
    (A) contacting said crude reaction mixture in a solvent extraction zone with about 50 to about 150 wt. percent of water and from about 50 to 150 wt. percent of a water insoluble inorganic solvent for the pyrazines boiling outside the range of 160° to 210° C., based on the weight of said crude reaction mixture to obtain a raffinate substantially free from pyrazines,
    (B) distilling said raffinate in an azeotropic distillation zone in the presence of an organic azeotroping agent selected from the group of aromatic hydrocarbons, aliphatic hydrocarbons, olefins and halogenated aromatic hydrocarbons boiling below about 175° C. to obtain a bottoms fraction consisting essentially of 2-methyltriethylenediamine substantially free from pyrazines and 2-methylpiperazine, and
    (C) distilling the bottoms fraction of the azeotropic distillation to recover the purified 2-methyltriethylenediamine.

3. A method as in claim 2 wherein the organic solvent is benzene and wherein the azeotroping agent is nonene.

4. A method which comprises the steps of contacting a methyl-substituted hydroxyethylpiperazine feedstock with from about 5 to about 10 mols of ammonia per mol of feedstock with a solid cyclization catalyst to provide a crude reaction mixture containing low-boiling hydrocarbon by-products, 2-methyltriethylenediamine, triethylenediamine, pyrazines, 2-methylpiperazine and high-boiling reaction by-products, fractionating said crude reaction mixture into a low-boiling by-products fraction, a crude 2-methyltriethylenediamine fraction containing triethylenediamine, pyrazines and 2-methylpiperazine and a high-boiling by-products fraction, countercurrently contacting said crude 2-methyltriethylenediamine fraction in a solvent extraction zone with from about 50 to about 150 wt. percent of a solvent for the pyrazines selected from the group consisting of olefins, aromatic hydrocarbons, aliphatic hydrocarbons, ethers and nitriles boiling outside the range of 160° to 210° C. to obtain a raffinate fraction substantially free from pyrazines, distilling said raffinate fraction in the presence of an organic azeotroping agent for 2-methylpiperazine boiling below about 175° C. in an amount sufficient to provide a distillate fraction containing the azeotroping agent, the balance being 2-methylpiperazine, and a bottoms fraction containing the 2-methyltriethylenediamine and recovering said 2-methyltriethylenediamine, as a purified product.

5. A method as in claim 4 wherein the solvent is benzene and the azeotroping agent is an aliphatic hydrocarbon.

6. A method as in claim 5 wherein the aliphatic hydrocarbon is nonene.

References Cited

UNITED STATES PATENTS

| 2,940,973 | 6/1960 | Patton | 203—67 |
| 3,033,864 | 5/1962 | Britton et al. | 203—69 |
| 3,105,019 | 9/1963 | Murray et al. | 203—69 |
| 3,157,657 | 11/1964 | Brader | 260—268 |
| 3,297,701 | 1/1967 | Brader et al. | 260—268 |

WILBUR L. BASCOMB, JR., *Primary Examiner.*